United States Patent [19]

Brancher et al.

[11] Patent Number: 5,501,472
[45] Date of Patent: Mar. 26, 1996

[54] DUAL COMPRESSION SEAL FOR CONDUITS WITH COMPLIANCE TO BOTH AXIAL AND ANGULAR MOVEMENT

[76] Inventors: Rodney E. Brancher, P.O. Box 12344, Wilmington, Del. 19850; Anthony C. Paladinetti, Jr., 742 Taunton Rd., Wilmington, Del. 19803

[21] Appl. No.: 224,904

[22] Filed: Apr. 8, 1994

Related U.S. Application Data

[63] Continuation-in-part of Ser. No. 945,501, Sep. 16, 1992, abandoned.

[51] Int. Cl.$^6$ ...................................................... F16J 9/04
[52] U.S. Cl. ........................... 277/178; 277/101; 277/181; 277/212 FB; 285/237
[58] Field of Search ........................ 277/178, 181, 277/212 R, 212 FB, 101, 212 C, 212 F, 205, 137, 169, 183, 184; 138/94, 108, 112; 285/237

[56] References Cited

U.S. PATENT DOCUMENTS 3,243,240  3/1966  Arthur .
3,707,852  1/1973  Burckhardt et al. .
4,109,976  8/1978  Koch ................................. 277/212 FB
4,327,925  5/1982  Alexander et al. .
4,702,645  10/1987  Skinner et al. .
4,767,108  8/1988  Tanaka et al. ...................... 277/212 R

FOREIGN PATENT DOCUMENTS 0944434  4/1949  France ................................. 277/189

*Primary Examiner*—Daniel G. DePumpo

[57] ABSTRACT

A compression seal for conduits that pass through watertight barriers, such as containment sumps for underground gasoline pumping systems, involving two annular seals of compressible material, a first in the barrier aperture and a second on the conduit, connected by a flexible conical section which provides compliance to both axial and angular movement of the conduit. An inner supporting ring of rigid material is used to force and maintain the first seal in compression sealing relationship, irrespective of roundness variations, within the aperture, and a screw tightened band is used to retain the second seal in a compression sealing relationship about the conduit.

11 Claims, 3 Drawing Sheets

DUAL COMPRESSION SEAL FOR CONDUITS WITH COMPLIANCE TO BOTH AXIAL AND ANGULAR MOVEMENT

This application is a continuation-in-part of application Ser. No. 07/945,501, which was filed by the inventors herein on Sep. 16, 1992, now abandoned.

BACKGROUND OF THE INVENTION

1. Field of the Invention

The present invention relates to the field of sealing piping passing through wall apertures and particularly to flexible seals for underground piping in access sumps at the interface between the pipe and the sump wall.

2. Problem to be Solved

Access sumps, which have openings called "manways", are used for easy access to pumps and underground plumbing components while also acting as containment chambers for any leaks or spills that may occur in the piping system. Spill containment has become an important consideration, for environmental reasons, when dealing with toxic chemicals or the handling of fuels in gasoline stations. Proper containment demands new standards for sealing the pipes and plumbing that enter or leave the containment sumps through wall apertures, that is, the pass- or feed-throughs must have some form of dependable and adaptable seals.

As a particular instance, below ground sumps have been used in the plumbing of gasoline stations for decades for both easy access to the critical pumps and fittings and, more recently, for the containment of small spills that could leach into the ground and cause pollution of drinking water in nearby buildings and homes. One of the paramount problems encountered in properly installing sump containment systems is the adverse environmental conditions that may exist at the installation site. These conditions may include everything from bad weather to dirt and water contamination during assembly. Such adverse conditions can make the precision alignment of pipes and fittings difficult, and, as a result, the piping may be offset or enter the sump at an angle. If the seals to the sump walls are made by welding (either steel or plastic), or by other rigid means, there may be delayed cracking of the joints because of long-term settling of components in the ground fill that can change the angle of the piping in the region where it enters the welded seal.

One of the most common problems during on-site installation of the sumps is the difficulty in cutting accurate holes in the sump wall, which, when out-of-round, can prevent proper sealing of the feed-through bushings. Consequently, initial seals are often subject to breakdown after the installation. Further, some of the presently used seals utilize hold-down bolts and inserts that are corrodible and require an accurate pattern of mounting holes. Drilling of these holes requires skill and frequently must be carried out under poor installation conditions.

Sumps are presently being made primarily of plastic, such as heavy walled polyethylene, to overcome the long term problem of the rusting out of metallic sump apertures. On-site plastic welding to make a seal between the piping and the interface bushings utilizes plastic rods that are melted around the feed-through bushing. This method when used to produce a long-term seal has had a high incidence of failure due to cracking by the weld. The most common causes of cracking at the welds involve: (1) the difficulty in making a good weld in cold weather; (2) the difficulty in maintaining clean surfaces during the welding process; and, (3) the fact that the newer cross-linked (rigid) polyethylene, which is approximately 100% stronger, cannot be used in the welding process thereby limiting the choice of best materials for overall long term durability of the sumps.

The commonly used solid fittings for the sump wall interface and pipe feed-throughs have proven to be a weak point due to the fact that when some of the underground components, such as the fuel tank, begin to settle or rise over a period of time the angle of the delivery pipes is caused to change thus setting up continuous stress on the less flexible seals.

PRIOR ART

U.S. Pat. No. 4,639,164, issued in January of 1987 to Pugnale, is one of the earliest pertinent prior art showings of a general system using access sumps as a temporary containment means for fuel spills and secondary or double walled protection against leaks in the piping. This system is exemplary of the sealing techniques that have been used and the shortcomings under adverse installation conditions which the present invention is directed to overcoming. Soft plastic tubing is used as the secondary or double wall on the fuel conducting pipes. These soft plastic tubes can be slowly attacked by any residual fuel either before or after a spill has been drained from the containment sump. Additionally, the soft plastic tubing does not retain a good compression seal when clamped because of the cold flow characteristic of the soft plastics.

A preformed fiberglass sump is used here but this design does not anticipate the need to make feed-through holes in the sump under on-site conditions as is frequently necessary. The preformed sump of the Pugnale system has bushings at specific 45 degree locations on the sump walls which cannot readily accommodate the frequent vertical and horizontal deviations which occur during an on-site installation. Also, the fixed bushings in the preformed fiberglass sump walls do not adapt to wide angles of pipe deviation which is an essential problem that the present invention is directed to solving.

The most pertinent prior art patents are believed to be those of Webb, U.S. Pat. Nos. 4,805,444, which issued in February of 1989, and 5,040,408 and 5,060,509, which issued as continuations in part in August and October of 1991. All of these patents utilize telescoping (close fit) sections of rigid pipe for the secondary containment system that surrounds the primary piping. It is the rigid secondary piping which must pass through and seal to the "bulkhead couplings" which are then affixed to the sump "bulkheads" by "welding" with melted plastic rods and hot wire electrical strips. These welds have proven to be prone to cracking under stress conditions and especially when the weld interfaces are made under contaminated conditions and/or when the critical mass is too cold to be properly heated, either by the melted plastic "welding" rod that is used or the electrical heating that is available.

OBJECTS

The present invention is directed to addressing and overcoming many of the shortcomings of the prior art systems that result in leaks in the interface between the piping and the containment sumps by providing a sealing system that completely avoids the difficult heat and electrical welding operations in hard to get at locations that are inherent in the WEBB and related prior art systems.

It is accordingly an object of the present invention to provide a flexible compression seal system which can adapt to irregular or out-of-round feed-through holes by utilizing durable elastomer material.

It is another object of the invention to eliminate the need for on-site plastic welding and to overcome the limitation of not being able to use the new rigid (cross-linked) polyethylene moldings for durable sumps.

It is still another object to provide a new compression seal design with a conical web between dual compression seals to accommodate relatively large angles of deviation of the delivery pipes with the sump walls without causing stress on the pipes, the independent dual seals for the pipes, or the sump wall apertures.

It is a further object of the invention to eliminate the need for hold-down bolts for containment seals and thereby eliminate all integral corrodible components.

SUMMARY OF THE INVENTION

The present invention involves a flexible, dual, compression seal arrangement which circumvents some of the most critical problems of the prior art systems, such as, the stresses on rigid seals when there are deviations in pipe angles with the sump walls, lack of precisely formed feed-through holes in the sump walls, and the low probability of getting perfect and permanent seals with either plastic welding or compounds under typical contaminated and weather affected conditions.

Accordingly, an improved compression seal is provided for conduits or pipes which pass through apertures in watertight walls to enable both axial and angular movement of the conduits during and after installation. The dual compression seal construction is composed of an outer compressible rim seal portion that has an inner supporting ring of substantially rigid material to force and maintain it in a fixed compression sealing relationship within apertures that may have irregular or out-of-round edges, an inner cylindrical-section seal portion that is compressible and expandable and has a screw-tightened band which fixedly retains it in a compression sealing relationship about a conduit, and a conical section flexibly connecting the outer and inner seal portions to allow axial and angular movements of the conduit with respect to the aperture without affecting the integrity of the fixed seals. The outer and inner seal portions and the conical section are integrally molded of elastomer material and installation of the dual seal system is facilitated by a two part screw-operated hand press device that works against one side of the wall surface about the aperture and against a lip or flange on the supporting ring to force the outer seal portion through the aperture.

BRIEF DESCRIPTION OF THE DRAWINGS

The structural and operational simplicity and economical advantages of the flexible seal of the present invention will become clear and apparent upon a consideration of the following drawings, descriptions, and claims, which drawings illustrate the following.

DETAILED DESCRIPTION OF THE PREFERRED EMBODIMENT

Considering the difficult installation conditions in underground distribution systems and the growing emphasis on spill containment, the actual method of installing sump seals can be as important a consideration as their mechanical design so that the present invention will be structurally described along with reference to a method and means of installation.

Figure 1:
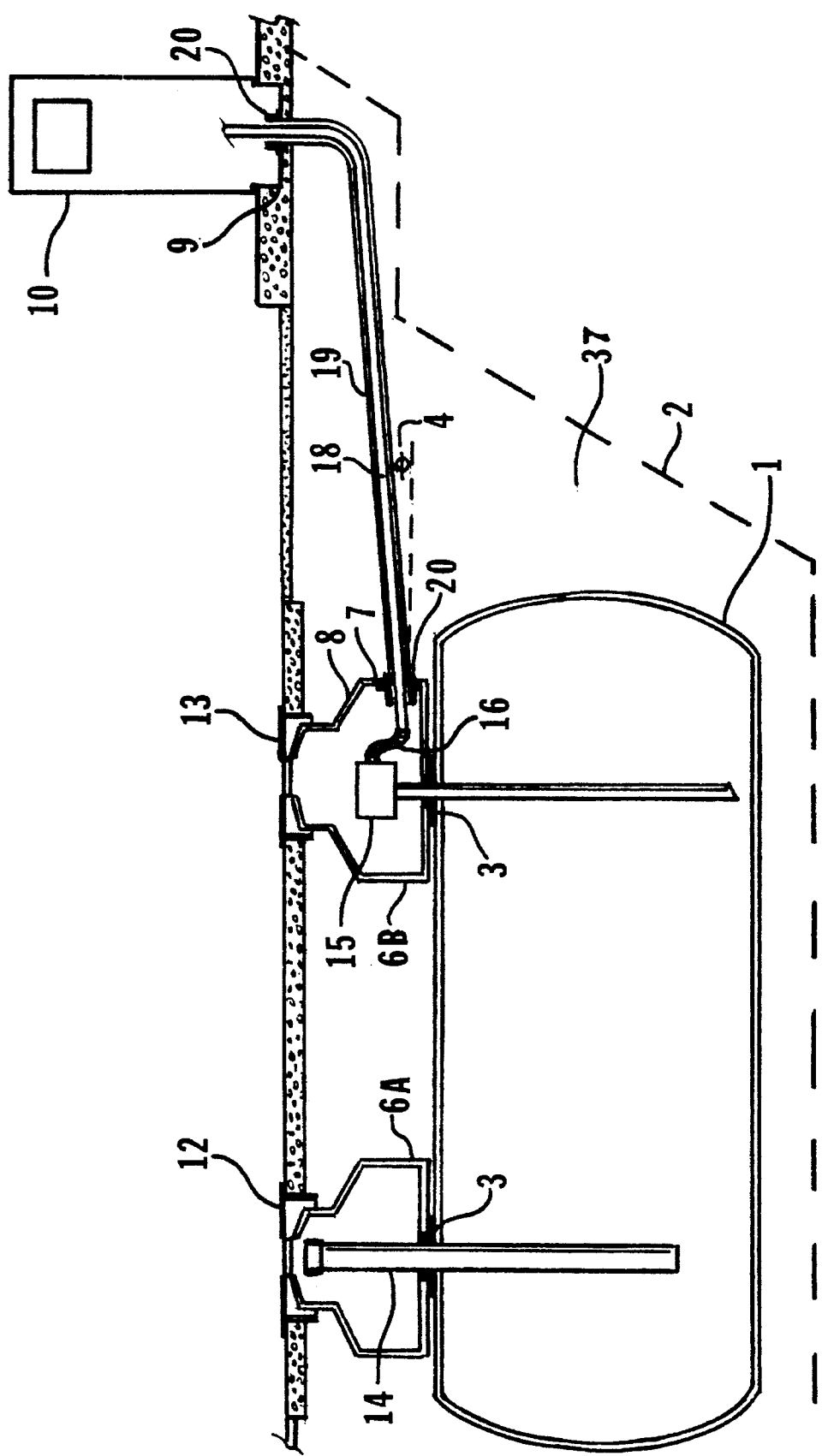
FIG. 1 shows a typical spill containment system which includes a fill sump 6A, with fill tube 14, and a pumping sump 6B, with pump 15, along with piping 16, 18, and 19 to which a flexible, dual, compression seal 20 in accordance with the invention is applied.

Since the relatively adverse conditions under which spill containment installations must be made cannot be appreciably changed, it remains for the structures and operating methods to be changed to be less sensitive to unpredictable deviations in layout or dimensions and to reduce the assembly process to lower skill levels without affecting a quality result. To begin the description of how the present invention achieves this end, reference is made to FIG. 1 which shows a typical underground spill containment system for a gasoline station. A fuel tank 1 is located in a deep excavation 2 which is usually filled with pea gravel 37 to avoid using soil for backfill that can pack or settle with time. The installation includes two sumps, a fill sump 6A with a fuel fill tube 14, and a pumping sump 6B with a pump 15 connected to a fuel withdrawal tube. Both sumps have "manway" covers 12 and 13, and have seals 3 in the regions where they are mounted on, and the tubes enter, the storage tank 1. A flex pipe 16 is connected between the pump 15 and a primary fuel conducting conduit or pipe 18 which feeds fuel to a dispensing pump 10 on the surface. A secondary containment conduit or pipe 19 surrounds pipe 18 and is opened at the ends where pipe 18 passes through the wall 8 of sump 6B and the base 9 of the dispensing pump 10. The aperture 7 in sump wall 8, through which pipe 19 passes, is fitted with a flexible, dual, compression seal 20 in accordance with the invention.

It will be appreciated that once the gravel backfill 37 is in place, it is not an easy matter to make position changes to the tank 1 and since the angle 4 of the fuel piping 18 and 19 with the sump wall 8 could be out of perfect alignment at the time of assembly, it is important that the seal be adaptable. Also, the required position of the feed-through aperture 7 in the sump wall 8 can cause the orientation of the piping 18, 19 to turn out to be at a considerable angle 4, with the wall 8 as seen in the Figure. Both the boring of the aperture and the adaption to an unexpected angular change can be an installation problem with most of the existing installation methods. In particular, it is extremely difficult to form a perfect aperture since its rim or edge will typically be irregular, e.g., tapered, beveled, or out-of-round. However, with the seal 20 of the invention the drilling or boring of the sump wall aperture 7 need not have a perfectly rounded rim to receive the seal as will now be described with reference to FIG. 2.

Figure 2:
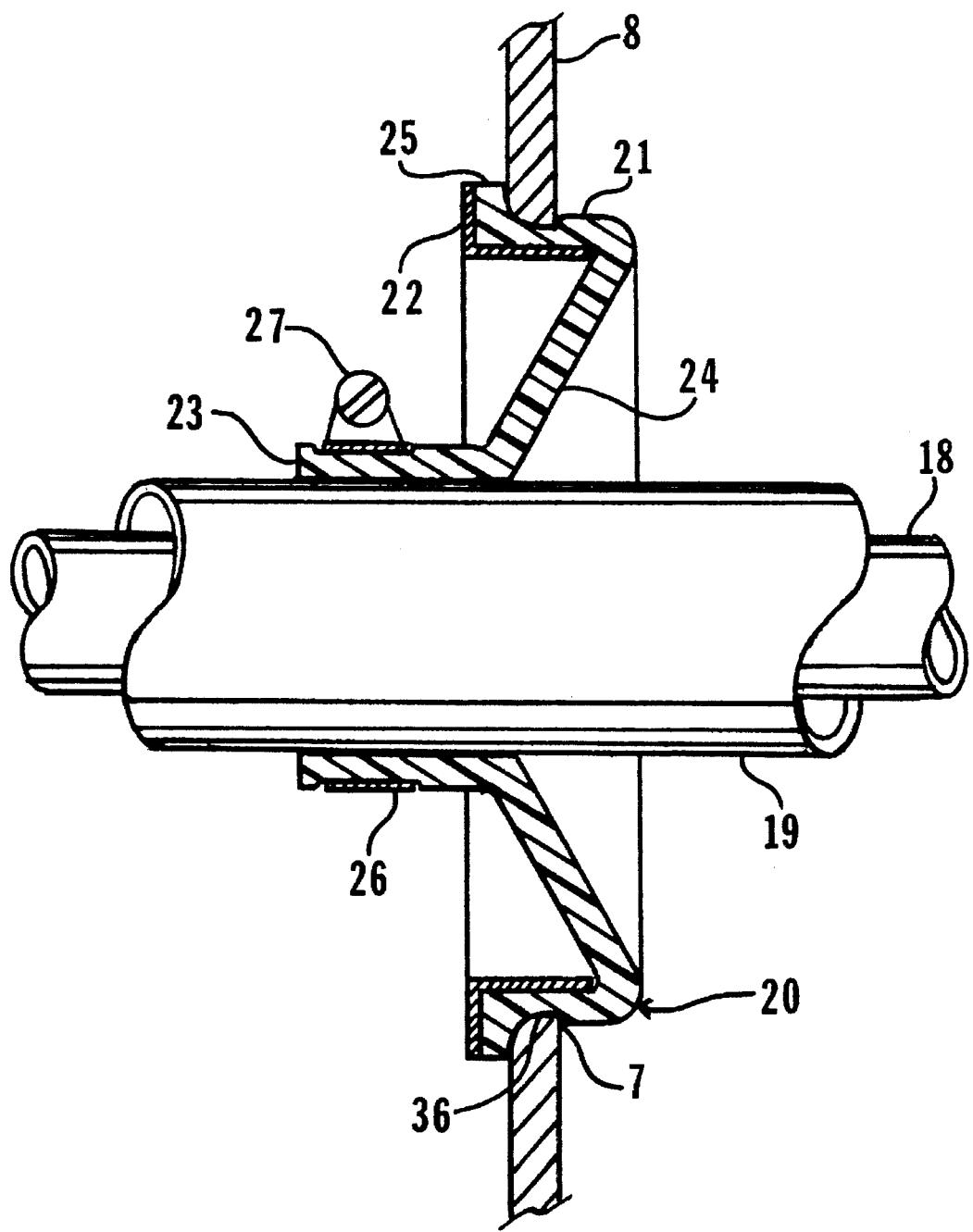
FIG. 2 is a diagrammatic view of a flexible seal of the invention, in section, disposed in a sump wall aperture.

Seal 20 is constructed of an outer compression seal portion 21 and an inner compression seal portion 23 which are connected by a conical web portion 24. All three portions may be integrally molded from a flexible plastic material such as a chemical- and weather-resistant elastomer. Buna rubber and equivalents are preferred for use in this regard. Portion 21 is in the form of a thick compliant compression member with an annular section 36 for fitting into the aperture 7 and an upstanding end flange 25 for engaging the sump wall 8 at the aperture. The thickness of portion 21 is selected along with its compliance to engage, fill, and seal irregular or out-of-round edges or surfaces of the rim of the aperture 7 when compression fitted into the aperture as shown in FIG. 2. End flange 25 completes the seal against the sump wall 8. Thus, the conforming construction of portion 21 allows less demanding precision and shaping requirements to be imposed when drilling or boring the aperture 7 in the sump wall 8 on the installation site. Also, as welding is obviated, the wall may be constructed of rigid (cross-linked) polyethylene and similar materials without regard to their welding capabilities.

The sealing portion 21 is compression fitted into the aperture 7, and the seal enhanced, by means of a supporting or locking ring 22 which has a substantially right-angle cross-section to maintain the shape of the flange 25 and back up the compression of section 36 against the out-of-round or tapered wall of the aperture. Ring 22 is of more rigid construction than portion 21 and preferably also of non-metallic, non-corrodible material. It may be integrally formed with portion 21, such as by differently processing the appropriate surface areas of the material of portion 21, but preferably ring 22 is separately formed of a material that is sufficiently rigid to compress the material of portion 21 while flexible enough to somewhat follow the irregular contours of an out-of-round aperture in order to sealingly conform portion 21 to those contours. It has been found that adhering the annular part of the separate ring 22 to the inner annular surface of section 36 with a quick-acting cyanacrylic glue stabilizes the entire seal during the compression assembly and then maintains the compressive seal fixedly against the tapered lip of the wall aperture 7 when assembly is completed.

Cylindrical seal portion 23 engages the outside of containment pipe 19 and is connected to portion 21 by conical web portion 24 which is flexible to allow wide angular movement of the combined piping 18, 19. Web portion 24 retains the pipe engaging portion 23 near the mid-point or centerline of the wall aperture 7 while permitting the secondary pipe 19 to be oriented at angles of anywhere up to about 30 degrees. To this end, the angle of the conical surface of web portion 24 may be flexibly varied between about 30 and 60 degrees with the centerline without causing undue stress on the dual seals of portions 21 and 23. Portion 23 is flexible and adaptable during pipe insertion and is then fixedly sealed to the pipe surface such as by the application of a band clamp 26. Clamp 26 may have a tightening screw 27 to secure a tight fixed seal between the engaging surfaces of pipe 19 and portion 23. Fuel pipe 18 remains free to move within containment pipe 19 in this arrangement. Portion 21 and portion 23 may be arranged to be disposed on opposite sides of the aperture for difficult to reach installation locations.

Figure 3:
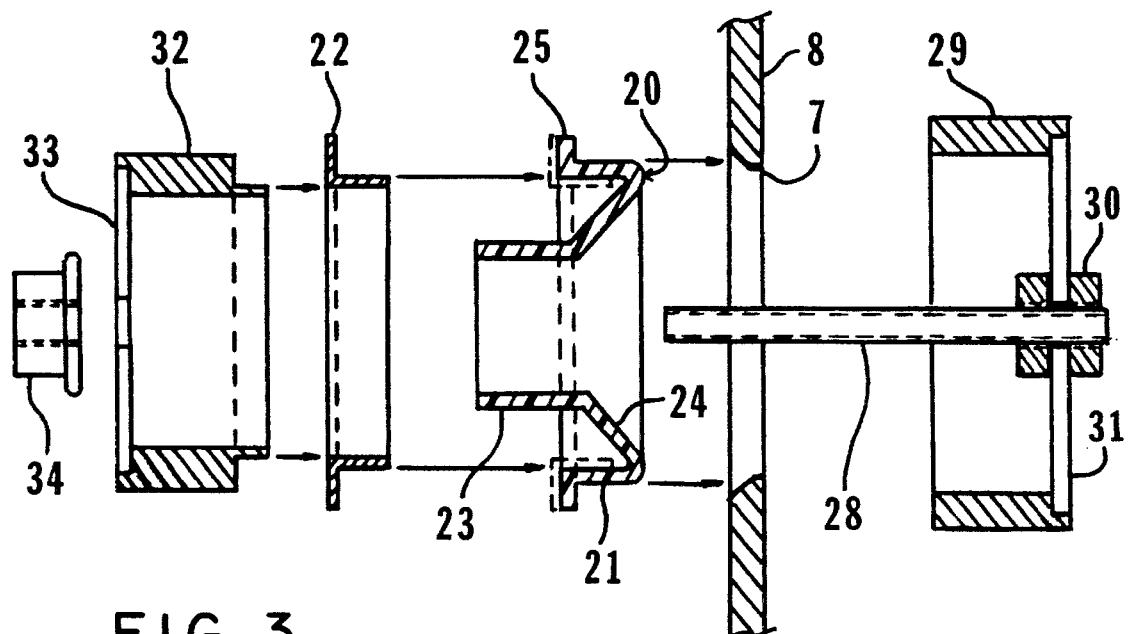
FIG. 3 is an exploded view illustrating the arrangement of the seal of the present invention, along with a locking ring and a convenient insertion tool, when the seal is being installed in a tapered or out-of-round aperture in a sump wall.
Figure 4:
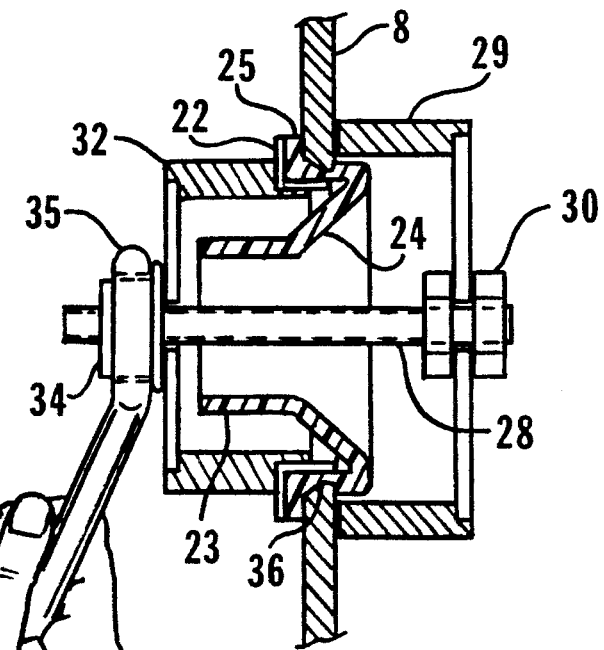
FIG. 4 is a view, mostly in cross-section, of the installed seal of the invention illustrating the operation of the insertion tool.

The assembling operation for installing the flexible seal 20 of the invention in a panel or wall, such as a sump wall, will be described with reference to FIGS. 3 and 4. It will be seen that an installing tool, embodying a two part screw-press arrangement, may be used for pressing the seal portion 21 and locking ring 22 into aperture 7 with a simple wrench 35. The tool is shown in the installation starting position in FIG. 3 having an insertion compression screw 28 with an attached bucking cylinder 29, disposed at the right, and an insertion compression cylinder 32 with a flanged take-up nut 34, disposed at the left. The compression screw 28 is affixed to a backplate 31 of the bucking cylinder 29 by locking nuts 30, and the cylinder 29 has an internal diameter (I.D.) that will not interfere with the passage of the annular section 36 of seal 20 through aperture 7. The compression cylinder 32 has an annular lip extension that fits into the I.D. of the locking ring 22 and has a backplate 33 with a center hole through which the compression screw 28 extends when the two tool parts are being brought together. The flange on take-up nut 34 is dimensioned to engage the surface of backplate 33 about the center hole when the end of screw 28 is drawn into the threaded hole in nut 34.

To begin the assembly of the seal, the annular portion 36 of flexible seal 20 is placed in the aperture 7 in engagement with the out-of-round, tapered, or beveled edge on one side of the panel or wall 8. The bucking cylinder 29 is placed on the opposite side of the wall 8 with the compression screw 28 extending through the aperture 7 and seal 20. The annular lip of the compression cylinder 32 is fitted into the locking ring 22 and both are disposed about the end of compression screw 28 with the annular part of the ring 22 engaging the annular section 36 of seal portion 21. The take-up nut 34 is then spun on the end of screw 28, using a wrench 35, to draw the parts together. Compression cylinder 32 engages the upstanding flange on locking ring 22 and forces the ring to press seal portion 21 into the aperture 7 from one side of wall 8 as cylinder 32 is drawn by nut 34 along screw 28 toward bucking cylinder 29 which is engaging the other side of wall 8. The flexibility of the material of seal portion 21 results in annular section 36 compressibly conforming to the surface of and tightly sealing the rim or edge of aperture 7, which sealing is backed up and supported by ring 22 which firmly retains the seal in the aperture.

After the outer seal is secured in the aperture 7 by the supporting ring 22 using the tool and wrench as described, the containment pipe or conduit 19 may be inserted through the inner seal, the portion 23 of which is flexible and adaptable during pipe insertion. Portion 23 may then be fixedly sealed to the pipe surface by the application of a compression means such as band clamp 26. Clamp 26 may have a tightening screw 27 to secure a tight compression seal between the engaging surfaces of pipe 19 and portion 23. Fuel pipe 18 may then be passed through pipe 19 and will remain free to move within it in this arrangement.

What is claimed is:

1. A compression seal for a conduit that passes through a feed-through aperture in a watertight wall, wherein said feed-through aperture has an irregular rim and wherein said seal fixedly conforms to the irregular aperture rim and allows longitudinal movement of said conduit along the centerline of said aperture as well as wide angular movements with respect thereto, said compression seal comprising:

aperture rim sealing means, having a flange portion which compressively engages a face of the watertight wall and an annular portion connected to said flange portion and compressively engaging the rim of said aperture in said wall, for fixedly sealing said rim of said wall aperture;

locking ring means, having a substantially right-angle cross-section, for compressing said flange portion and said annular portion of said aperture sealing rim means to follow the contours of said wall and said irregular aperture rim to compressively secure said aperture rim sealing means in said wall aperture;

conduit sealing means, having an annual portion compressed about said conduit, for fixedly sealing the periphery of said conduit; and conical web means of flexible material for sealingly connecting said aperture rim sealing means and said conduit sealing means and allowing longitudinal and angular movements of said conduit with respect to the centerline of said aperture.

2. A seal as in claim 1, wherein said aperture rim sealing means, said conduit sealing means, and said conical web means are integrally formed.

3. A seal as in claim 1, wherein said aperture rim sealing means, said conduit sealing means, and said conical web means are integrally molded from an elastomer material.

4. A seal as in claim 1, wherein said aperture rim sealing means, said conduit sealing means, and said conical web means are integrally molded from buna rubber.

5. A seal as in claim 1, wherein said aperture rim sealing means, said locking ring means, said conduit sealing means, and said conical web means are integrally formed.

6. A seal as in claim 1, wherein said conduit sealing means further comprises band clamp means for compressing said annular portion against said conduit.

7. A seal as in claim 1, wherein said locking ring means comprises an annular surface for engaging the inner surface of said annular portion of said rim sealing means.

8. A seal as in claim 7, further comprising means for adhering said annular surface of said locking ring means to said inner annular surface of said rim sealing means, said adhering means comprising a quick-acting cyanacrylic glue.

9. A seal as in claim 1, wherein said conical web means is of a flexible material allowing the variation of its angle with said centerline from about 30 degrees to 60 degrees.

10. A dual compression seal for a round conduit that passes through a round feed-through aperture with irregular edge formed in a watertight wall that is substantially perpendicular to the center line of said round conduit, said dual compression seal allowing longitudinal movement of the round conduit along said center line as well as wide angular movements thereof relative to the watertight wall, said dual compression seal comprising:

an annular aperture rim seal portion including a radially-outwardly extending flange that is compressed against one face of the watertight wall, and a cylindrical section connected to said radially-extending flange and held in compression against the irregular edge of said round feed-through aperture in said watertight wall by a non-corrodible locking ring, which locking ring has a substantially right-angle cross-section for strength but is still flexible enough to follow the contours of the irregular edge of the aperture against which the cylindrical section of said aperture rim seal portion is compressively set;

an inner cylindrical seal portion that is retained and compressed against said round conduit by a screw-tightened band disposed around the periphery of said inner cylindrical seal; and a wide angle conical portion extending between said annular aperture rim seal portion and the inner cylindrical seal portion; with said dual compression seal being molded as a single unit from chemical- and weather-resistant flexible elastomer material, whereby said dual compression seal allows longitudinal movement of the round conduit along the center line thereof, as well as wide angular movements varying between 30 degrees and 60 degrees from said center line.

11. A seal as in claim 10, wherein said elastomer material is buna rubber.

* * * * *